Sept. 16, 1969    M. P. VANDER PLAATS    3,467,864
METHOD AND APPARATUS FOR MEASURING PULSE MAGNITUDE AND CHARGE
Filed Sept. 28, 1965
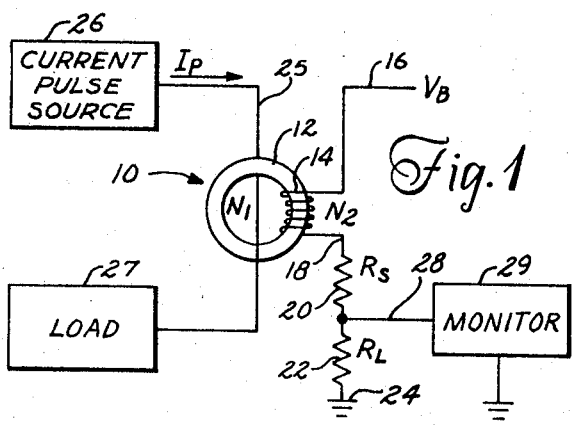
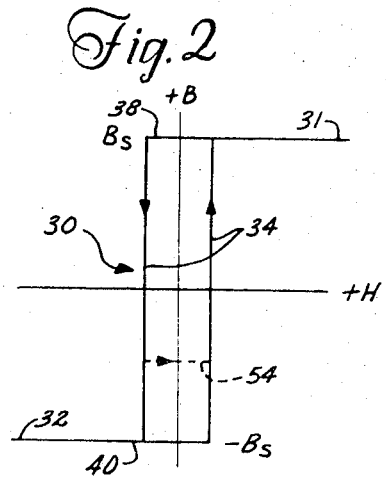
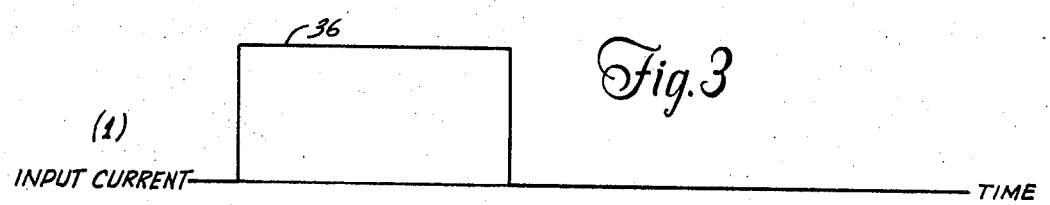
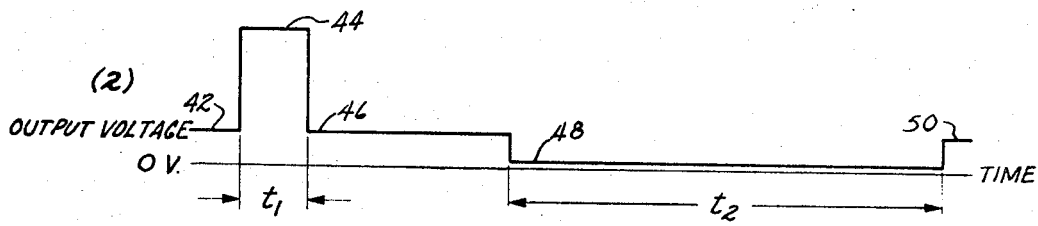
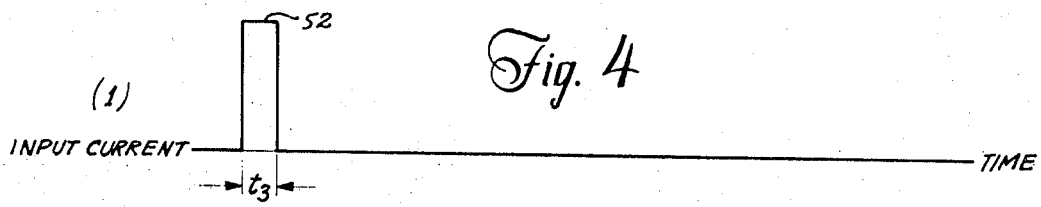
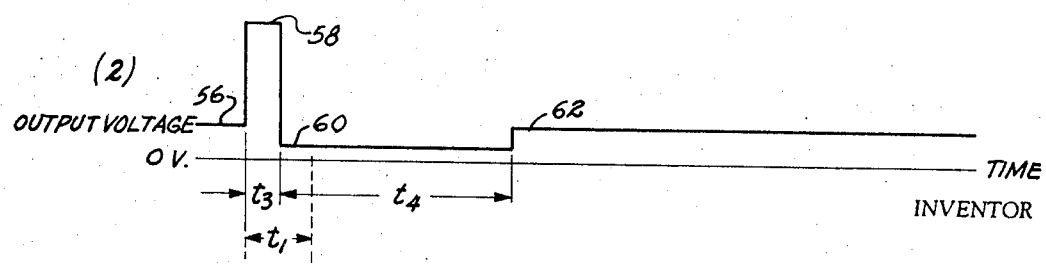
INVENTOR
MARVIN P. VANDER PLAATS
BY Tipton D. Jennings
ATTORNEY

United States Patent Office 3,467,864
Patented Sept. 16, 1969

3,467,864
METHOD AND APPARATUS FOR MEASURING PULSE MAGNITUDE AND CHARGE
Marvin P. Vander Plaats, Fullerton, Calif., assignor to The Susquehanna Corporation, a corporation of Delaware
Filed Sept. 28, 1965, Ser. No. 490,978
Int. Cl. G01r 19/08, 27/28
U.S. Cl. 324—102                                   4 Claims

ABSTRACT OF THE DISCLOSURE

Apparatus and a method are provided for measuring the magnitude and charge of a current pulse being applied to a load. The wire through which the pulse travels is coupled through a magnetic core. The core is biased into a saturated condition. The core is driven out of saturation during the presence of the current pulse, but once this pulse terminates, the core returns to saturation. The output of the core is monitored by apparatus which measures the time duration of the voltage changes occasioned by the changes of flux density in the core. These time durations are then mathematically converted, by the known circuit constants, into pulse current magnitude and charge.

---

This invention relates to electrical testing and electrical test equipment. More particularly, this invention relates to a method for detecting the passage of a short duration current pulse through an electrically conductive wire and for measuring the characteristics of the pulse, and it relates to pulse monitoring apparatus which performs these functions.

Numerous devices operate upon receipt of a brief pulse of electrical current. In the operation and testing of these pulse-operated devices there is required apparatus for detecting and monitoring the passage of the current pulse. For example, certain explosive wires and squibs used in rocket motors detonate upon receipt of a current pulse in the range of thirty amperes for four milliseconds. To evaluate the performance of a missile or rocket system it is necessary to know whether a detonating current pulse was in fact sent to an explosive wire or to a squib, and, if so, what the pulse magnitude and duration were. From this information it is possible to determine such things as whether the squib received an electric charge large enough to cause it to ignite and what the total drain on the missile batteries has been. Similar information about current pulses is necessary in the art of spot welding. Here, the current drawn by the welder will vary because of changes in resistance due to variations in the material being welded, deviations in the location of the welder contacts, or contamination of the contacts. Therefore, a means of monitoring the current pulse as it is received at the welder is necessary to indicate whether the proper current is reaching the weld.

Many methods are available for detecting and measuring the passage of a pulse of current through an electrical conductor. One method empolys a shunt resistor and a differential amplifier, the resistor being inserted into the line which carries the current. However, this presents a possible hazard to the monitoring equipment and personnel because of the high current and voltage levels encountered. Furthermore, this method only affords an indication of the current magnitude and not the total electric charge or pulse duration. Another problem with this shunt and differential amplifier approach is encountered when the information obtained is transmitted from a missile or a rocket via a telemetry system having several different frequency channels. The bandwidth of the channels in an FM/FM telemetry system is greater in the higher frequency channels, and the response time of the channels is proportional to the bandwidth. Many of the input circuits to such a telemetry system, including the shunt and differential amplifier, require a channel having a fast response time, and so a large bandwidth. Such devices require the use of the higher frequency channels of the telemetry system. Consequently, there are frequently not enough high frequency channels, while some lower frequency channels are unused. In addition the voltage developed across the shunt is frequently of such a level that random noise, radio-frequency interference (RFI), and electromagnetic interference (EMI) generate spurious output signals. Furthermore, the complexity of these devices makes them expensive.

Accordingly, one object of this invention is to provide an improved method of detecting the passage of a current pulse and of measuring the magnitude and electric charge of that pulse.

Another object of the present invention is to provide an improved method of monitoring current pulses which provides the operator and equipment with complete safety from dangerous current and voltage levels.

Another object is to provide a simply constructed monitor which is capable of detecting current pulses and which is electrically isolated from the conductor carrying the pulses.

A further object is to provide a current pulse monitor whose output can be transmitted via a relatively low frequency channel.

Still another object of the present invention is to provide an inexpensive current pulse monitor which demonstrates little susceptibility to noise, RFI, or EMI.

Broadly, the present invention uses a saturable magnetic core having a substantially rectangular hysteresis loop. The core is biased so that it is in one saturation extreme of the hysteresis loop, and it is inductively coupled with the conductor which will carry the current pulses. When a pulse of the proper polarity passes through the conductor, the core is driven out of saturation, into its unsaturated operating region, and toward the opposite saturation extreme of its hysteresis loop. After the current pulse has decayed, the bias returns the core to its original saturation state. If the current pulse does not last long enough to permit the core to reach its opposite sauration state, the core is in its unsaturated operating region during the entire time the current pulse is present. By monitoring the saturation state of the core, and particularly by monitoring the change in magnetic flux density within the core, the current pulse magnitude and electric charge are determined.

The invention is more fully described in the following detailed description and drawing, in which:

FIGURE 1 is a schematic representation of the preferred embodiment of the invention;

FIGURE 2 is a graph of the theoretical hysteresis loop for the toroidal core shown in FIGURE 1;

FIGURE 3 is a graphical representation of the input current and output voltage waveforms for an input pulse of sufficient duration to allow the core to reach negative saturation; and FIGURE 4 is a graphical representation of the input current and output voltage waveforms for an input pulse which is not of sufficient duration to allow the core to reach negative saturation.

A preferred embodiment of the invention is shown in FIGURE 1. In this embodiment a pulse monitor 10 comprises a toroidal magnetic core 12 having wound thereon a multi-turn secondary winding 14. One end 16 of winding 14 is connected to a source of DC bias voltage, $V_B$. The other end 18 of winding 14 is connected via a secondary resistor 20 and a load circuit or impedance, such as load resistor 22, to the DC return 24. Toroidal core 12 is inductively coupled with the conductor 25 which passes through the opening in the center of the core 12. Conductor 25 carries the current pulses which are generated in source 26 and sent to load 27 and which are to be detected and measured.

The current through coil 14 is monitored by observing the voltage developed across load resistor 22. This output voltage can be measured at output line 28 by a monitor 29 which may record the voltage by any conventional means, such as an oscillograph, or which may use the voltage to modulate a carrier signal in a telemetry channel. Secondary resistor 20 is made appreciably larger than load resistor 22 so that the output voltage measured at their junction via output line 28 can be kept to a low level. However, secondary resistor 20 can be omitted if sufficiently low voltage levels are present. Because the secondary winding 14 is electrically isolated from the input conductor 25, there is no likelihood of a malfunction in the input circuit causing a dangerous condition at the output connection 28.

FIGURE 2 depicts the idealized rectangular hysteresis loop 30 of core 12. The core has two saturated operating regions, 31 and 32 at either extreme of the hysteresis loop, and an unsaturated operating region 34 between these two saturated regions. $B_S$ represents the level of flux density needed for saturation. The core may be made from any of a variety of materials, such as the various ferrites and ferromagnetic alloys, which exhibit this rectangular hysteresis property.

In operation, core 12 is biased by $V_B$, so that it is saturated in one extreme of its hysteresis loop, here being the positive extreme 31 of hysteresis loop 30 shown in FIGURE 2. If a long current pulse, such as pulse 36 in line 1 of FIGURE 3, passes through conductor 25, core 12 is driven out of positive saturation at extreme 31 and down toward negative saturation at the opposite extreme 32 of hysteresis loop 30. A finite length of time is required for the core magnetization to drop from the upper limit 38 to the lower limit 40. The change in magnetic flux within the core 12 during this drop is related to the input voltage $E_P$ by the well-known equation $$E_P = N_1 \frac{d\phi}{dt} 10^{-8} \qquad (1)$$

Since $dt \approx \Delta t \equiv t_1$, $d\phi \approx \Delta \phi = \Delta B A_C = 2 B_S A_C$
and $$E_P = I_P (R_S + R_L) \left(\frac{N_1}{N_2}\right)^2$$

the time $t_1$ required for the core magnetization to drop from upper limit 38 to lower limit 40 is given by the equation:

$$t_1 = \frac{2 B_S A_C N_1 10^{-8}}{I_P (R_S + R_L) \left(\frac{N_1}{N_2}\right)^2} \qquad (2)$$

wherein:

$B_S$=the magnetic flux density required to saturate the core 12;
$A_C$=the cross-sectional area of the core 12;
$I_P$=the magnitude of the input current pulse through conductor 25;
$R_S$=the resistance of the secondary winding 14 and the secondary resistor 20;
$R_L$=the load resistance 22;
$N_1$=the number of turns of the input conductor 25 around the core 12 (equal to one in this embodiment); and
$N_2$=the number of turns of the secondary winding 14 around the core 12.

During the time $t_1$ when the core 12 is in the unsaturated region 34 of hysteresis loop 30, changing from positive saturation at upper limit 38 to negative saturation at lower limit 40, the change in magnetic flux within the core 12 generates a voltage in the secondary winding 14. This voltage causes a current to flow in the secondary winding 14, and thus in the load resistor 22. This current will be greater than, and independent of, the current due to the bias voltage $V_B$. Since this current is greater than the bias current, the voltage across load resistor 22 rises from its bias level 42 to a higher level 44, as seen in line 2, of FIGURE 3. After a time $t_1$ the core 12 reaches negative saturation at the lower limit 40, and there is no further change of flux within the core 12. Therefore, no further voltage is induced in the secondary winding 14, and only bias current flows through the load resistor 22. The voltage across resistor 22 drops to level 46, equal in magnitude to the previous level 42.

After the input pulse 36 terminates, the bias current begins to return the core 12 from the negative saturation level 40 to the positive saturation level 38. A finite time $t_2$ is required for this return. Time $t_2$ is given by:

$$t_2 = \frac{2 B_S A_C N_2 \times 10^{-8}}{V_B - (R_S + R_L) \frac{H_M L}{0.4 \pi N_2}} \qquad (3)$$

wherein:

$B_S$, $A_C$, $N_2$, $R_S$, and $R_L$ are defined above;
$V_B$=the bias voltage;
$H_M$=the maximum magnetizing force of core 12 (a physical property of the core material); and
$L$=the core length (mean circumference of toroid 12).

While the core 12 is in its unsaturated operating region 34 undergoing transition from lower limit 40 to upper limit 38, the change in flux within the core 12 causes the secondary winding 14 to present a high impedance to the bias voltage $V_B$. This reduces the current flowing in the secondary winding 14 and thus through the load resistor 22. Consequently, the voltage across the resistor 22 drops to level 48 less than the bias level 42, as shown in line 2 of FIGURE 3. After a time $t_2$ the core magnetization reaches upper limit 38. The flux within the core 12 is no longer changing. Hence, the secondary winding 14 no longer presents a high impedance to the bias voltage $V_B$. The current flowing in the secondary winding 14 rises to the bias current level, and the output voltage across resistor 22 rises to level 50, equal to the previous level 42. The circuit has now returned to its initial state and is ready to detect another pulse. Thus, it is seen that the pulse monitor 10 of FIGURE 1 is able to detect the beginning and the termination of a current pulse passing through a conductor 25. Furthermore, the value of input current can be determined by measuring the value of $t_1$ and solving Equation 2 for $I_P$. The electric charge within the current pulse can then be found by multiplying $I_P$ by the pulse length.

While characteristics of those current pulses which cause the reversal of saturation states as just described can be determined through computation, determination of the electric charge requires several steps. It has been found that this charge can be ascertained directly without computation, if the current pulse being monitored is of insufficient duration to permit the core saturation to reverse completely. If, as shown in line 1 of FIGURE 4, the input current pulse 52 is of a time duration $t_3$ less than the time $t_1$ required for the core magnetization to change from its upper limit 38 to its lower limit 40, then the core will not reach negative saturation. Many devices operate upon receipt of current pulses of such a short duration. Explosive wires and spot welders are typical of such devices. Rather than reaching negative saturation, the core magnetization will drop from positive saturation at upper limit 38 to some intermediate level in the unsaturated region 34 of hysteresis loop 30, for example intermediate level 54 shown as a dotted line in FIGURE 2. After the input current pulse 52 has terminated, the bias current will return the core magnetization from intermediate level 54 to the upper limit 38 and to positive saturation at extreme 31 of hysteresis loop 30. During transition of the core magnetization from upper limit 38 to intermediate level 54, the current in secondary winding 14, and thus the current through the load resistor 22, will rise, from the bias current level to a higher level. During transition from intermediate level 54 back to upper limit 38 the increased impedance of secondary winding 14 will cause the current to immediately drop to a level lower than the bias current. The output voltage across the load resistor 22 will follow this same pattern. As seen in line 2 of FIGURE 4, the output voltage is originally at a level 56 due to the bias current. Upon receipt of the input pulse 52 in conductor 25, the output voltage rises to level 58. When the input pulse 52 terminates, the output voltage drops to level 60, lower than bias level 56, as the core returns to positive saturation. When the core magnetization reaches the upper limit 38, the load voltage rises to level 62, equal to level 56, and the circuit is returned to its original state.

As can be seen in FIGURE 4, the input pulse 52 and the positive output pulse 58 each have a duration of $t_3$ which is less than $t_1$, the time as described in connection with FIGURE 3 which would be required for the magnetization of core 12 to drop from upper limit 38 to lower limit 40 for an input current pulse of the same magnitude. From Equation 2 the following expression is obtained, relating $t_3$, the duration of this input current pulse, and $\Delta B$, the change in magnetic flux density occurring within the core 12 as a result of the input current pulse:

$$(\Delta B) A_C 10^{-8} = t_3 I_P \frac{(R_S + R_L)\left(\frac{N_1}{N_2}\right)^2}{N_1} \quad (4)$$

Similarly from Equation 3 the following expression is obtained for the time $t_4$ required for the magnetic flux density within the core 12 to return to upper limit 38, after the input pulse has passed:

$$t_4 = (\Delta B) A_C 10^{-8} \frac{N_2}{V_B - (R_S + R_L)\frac{H_M L}{0.4\pi N_2}} \quad (5)$$

Substituting Equation 4 into Equation 5 gives the following relation:

$$t_4 = t_3 I_P \frac{(R_S + R_L)\left(\frac{N_1}{N_2}\right)}{V_B - (R_S + R_L)\frac{H_M L}{0.4\pi N_2}} \quad (6)$$

Thus, $t_4$, the time required for the core magnetization to return to positive saturation, is proportional to the product of $I_P$, the input current magnitude, and $t_3$, the input current duration, since for a given current monitor the other terms of Equation 6 are constant. This is true for any input pulse until negative saturation of the core 12 is achieved. Hence, the total electric charge of the input current pulse 52 can be determined by measuring the time $t_4$ and dividing its value by the constant term of Equation 6, which will be known from the circuit parameters.

Obviously, the greater the value of the time $t_1$ required for the core to reach negative saturation under the influence of the input current pulse, the greater the length of the current pulses that can be monitored. From Equation 2 it is apparent that the magnitude of the time $t_1$ will depend upon the magnitude of the current pulse in conductor 25 and on the value of the various parameters in the circuit. In practice these parameters can be controlled for a given current pulse magnitude to give a time $t_1$, and hence a maximum limit to time $t_3$, in the range from 50 microseconds to 100 milliseconds. Similarly, the parameters can be controlled to give a time $t_2$, which is the maximum limit of time $t_4$, in the range from 25 milliseconds to one second. The parameters will be selected to give times $t_1$ and $t_2$ most suitable for the particular application.

The voltage levels monitored can be kept small by proper selection of circuit parameters; for example, values of +0.5 volt for the bias level output (levels 42 and 56), +5.0 volts for the positive pulse (44 and 58), and +1.0 millivolt for the negative pulse (48 and 60) are typical.

The monitor 10 will discriminate against pulses of the polarity opposite to that desired, since such pulses will tend to drive the core 12 more deeply into positive saturation in extremity 31, and thus such pulses are incapable of producing an output from the monitor. The polarity of the bias voltage $V_B$ is selected to cause core 12 to saturate in the extreme of its hysteresis loop opposite that extreme toward which it is driven by the pulses to be monitored. To enable the monitor to detect pulses of the opposite polarity, either the bias voltage polarity is reversed or the direction of either the input or the output winding about the core 12 is reversed.

A pulse of the proper polarity is required to have a magnitude great enough to overcome the saturation of the core 12 before an output signal will be generated. A pulse below this minimum magnitude will not drive the core 12 into the unsaturated region 34 of its hysteresis loop 30, but will leave it saturated at the upper limit 38. The degree of saturation of core 12, and thus the minimum input current magnitude required, are determined by the bias current level flowing through secondary winding 14, and so by the value of the bias voltage $V_B$. The bias voltage $V_B$ can be controlled to require a minimum pulse current level great enough that spurious signals in the form of random noise, RFI, or EMI do not cause an erroneous output signal.

There are many ways in which the voltage across output resistor 22 can be monitored and the time $t_4$ determined. One way is to use an oscillograph to obtain a permanent record of the voltage across the output resistor 22 as a function of time. Another method is to integrate the output voltage with respect to time and to feed the result to an indicator or to a comparator circuit which is set to trigger an alarm at a given level. Thus, the total electric charge passed by the circuit can be directly indicated or can be used to give a "go" or a "no-go" signal. When used with a telemetry system, the pulse monitor output can be sent to a voltage-controlled oscillator, the output of which frequency modulates a subcarrier in an FM/FM telemetry system. The desired information regarding the input current pulse is obtained by monitoring the negative output pulse which has a time duration $t_4$ longer than the time duration $t_3$ of the input pulse. Therefore, it is possible to transmit this information via a telemetry channel having a slower rise-time, and thus a lower frequency, than is true with systems in which information is obtained directly from the shorter duration input pulse.

As has been described, the passing through the conductor 25 of a current pulse 52 of a duration less than that required to drive core 12 from positive saturation at upper limit 38 to negative saturation at lower limit 40 will cause an output as shown in line 2 of FIGURE 4 consisting of a positive pulse 58, above the bias output level 56, immediately followed by a negative pulse 60 of a level less than the bias level 56. Thus, if an output is observed which consists of a positive puse followed by a return to the bias level as shown in line 2 of FIGURE 3, it is known that the core magnetization has reached and is remaining in negative saturation, and thus that the input current is still present in conductor 25. Such an occurrence could be indicative of an equipment malfunction where the monitored device is designed to operate on pulses of a duration less than that required to drive the core to negative saturation. Then, observation of a deviation in the output from the bias level to a negative pulse level, such as level 48, would indicate the termination of the current pulse. If the output consisted of a positive pulse immediately followed by a negative pulse of a duration equal to time $t_2$, given in Equation 3 above, it would indicate that the core had just reached negative saturation. Such an occurrence could be indicative of marginal performance by the monitored equipment. Thus, the present invention not only detects the passage of the current pulse, it also permits measurement of the current magnitude and charge, from which battery drain can be determined, and it can detect equipment malfunctions evidenced by the generation of long duration input current pulses.

The monitor can be used in a multi-stage missile to detect the passage of the firing impulses to the squibs which ignite one of the later stages. Because there is no electrical connection between the monitor and the current conductor the monitor is installed before coupling the core to the conductor. When the squibs are installed, the current conductor 25 is threaded through the core 12. The output from the monitor, as described above, is connected into the missile telemetry system.

Minor modifications can be made to the design of the current monitor for specific applications provided inductive coupling exists between the core and the current conductor and provided the core is made of a material having a rectangular hysteresis loop. For example, instead of a toroid, the core can be C-shaped, thus permitting it to be slipped over a previously installed current conductor.

I claim:

1. A method of determining the electric charge contained within a current pulse, having a predetermined minimum magnitude and a maximum duration and having a preselected polarity, when said current pulse passes through a current conductor, comprising:
   (a) inductively coupling said conductor to a core of magnetic material having a substantially rectangular hysteresis loop, with a first saturated operating region, a second saturated operating region, and an unsaturated operating region, said operating regions being distinguished by different magnetic flux densities within said core;
   (b) inductively coupling said core to an electric winding having a first end and a second end;
   (c) connecting a source of bias voltage to said first end and a load circuit to said second end of said electric winding, thereby to produce a current in said electric winding causing a flux density within said core sufficient to drive said core to said first saturated operating region and establishing a voltage drop across said load circuit;
   (d) monitoring the increase in voltage drop across said load circuit in response to the change in magnetic flux density within said core as said core is driven out of said first saturated operating region into said unsaturated operating region, and toward said second saturated operating region upon the arrival in said conductor of a current pulse of said preselected polarity and of said preselected minimum magnitude and maximum duration;
   (e) monitoring the decrease in voltage drop across said load circuit in response to the change in the magnetic flux density within said core as said core is returned to said first saturated operating region after said current pulse has subsided, and measuring the time for which said decreased voltage drop endures; and
   (f) adjusting said measured time by a constant value to effect a determination of the electric charge within said pulse.

2. A method of determining the electric charge contained within a current pulse having a predetermined minimum magnitude and a predetermined maximum duration and having a preselected polarity wherein said current pulse passes through a conductor, said conductor being wound on a core of magnetic material about which is also wound a second winding known as a bias winding, said bias winding being a multiturn winding and being connected on its first end to a source of bias voltage and on its other end to a load resistor, said core having a substantially rectangular hysteresis loop with a first saturated operating region, a second saturated operating region, and an unsaturated operating region, said operating regions being distinguished by different magnetic flux densities within said core, said bias voltage causing a bias current to pass through said bias winding to drive said core to saturation in said first saturated operating region, said core being driven out of said first saturated operating region into said unsaturated operating region and toward said second saturated operating region when a pulse of said preselected polarity and said predetermined minimum magnitude is present within said conductor, said predetermined maximum duration of said current pulse being such that said current pulse does not exist for sufficient time to permit said core to reach said second saturated operating region, said bias current returning said core to said first saturated operating region upon the termination of said current pulse, said method comprising:
   (a) selecting the value of said bias voltage, the value of said load resistor, the number of turns of said multi-turn bias winding, and the magnetic properties of said core so that the time required for said core to return to said first saturated operating region after the termination of said current pulse is related to the product of the current pulse magnitude and the current pulse duration by a constant factor,
   (b) measuring the time required for the return of said core to said first saturated operating region after said current pulse has terminated; and
   (c) adjusting said measured time by said constant factor to effect a determination of the total electric charge of said current pulse.

3. A method of determining the charge contained within a current pulse having a preselected polarity and having a predetermined maximum duration and minimum magnitude, when said current pulse passes through a current conductor, said method comprising:
   (a) inductively coupling said conductor to a core of magnetic material having a substantially rectangular hysteresis loop with a first saturated operating region, a second saturated operating region, and an unsaturated operating region, said operating regions being distinguished by different magnetic flux densities within said core;
   (b) inductively coupling said core to an electric winding having a first end and a second end;
   (c) connecting a source of bias voltage to said first end and a load resistor to said second end of said electric winding, thereby to produce a current in said electric winding causing a flux density within said core sufficient to drive said core into said first saturated operating region and establishing a voltage drop across said load resistor;
   (d) monitoring the increase and the decrease in the voltage drop across said load circuit in response to variations in the magnetic flux density within said core resulting from the passing of said current pulse through said conductor, and measuring the time during which the voltage drop is of a decreased value; and
   (e) computing said charge by means of the equation:

$$C = \frac{T(0.4\pi VN - RHL)}{0.4\pi R}$$

wherein C is the value of said charge, T is the time during which the voltage drop is of a decreased value, V is the magnitude of said bias voltage, N is the number of turns of said multi-turn bias winding, R is the value of said load resistor, H is the core magnetization force, and L is the core length.

4. A method of determining the magnitude of a current pulse having a predetermined magnitude and a predetermined maximum duration and having a preselected polarity, when said current pulse passes through a current conductor coupled to a magnetic core having a substantially rectangular hysteresis loop, comprising the steps of:
(a) biasing said core into saturation, said saturated condition being such that the curernt pulse to be detected will drive said core out of saturation and towards saturation in the opposite direction;
(b) measuring the time duration of a first change in magnetic flux density as said core is driven out of saturation in response to the application of said current pulse;
(c) measuring the time duration of a second change in magnetic flux density as said core returns to saturation in response to the termination of said current pulse; and
(d) converting these measurements by a known constant into a value indicative of said current pulse magnitude.

References Cited

UNITED STATES PATENTS

| | | | |
|---|---|---|---|
| 2,424,977 | 8/1947 | Grieg | 332—12 |
| 2,780,782 | 2/1957 | Bright | 332—12 |
| 2,808,578 | 10/1957 | Goodell et al. | 332—12 XR |
| 2,875,412 | 2/1959 | Kaplan | 332—12 |
| 3,132,256 | 5/1964 | Giel | 332—12 XR |
| 2,498,475 | 2/1950 | Adams | 336—155 XR |
| 2,752,510 | 6/1956 | Hall. | |
| 2,886,790 | 5/1959 | Snyder | 336—155 |
| 3,134,055 | 5/1964 | Le Cronier et al. | |
| 3,158,838 | 11/1964 | Gilbert | 324—117 XR |

FOREIGN PATENTS

| | | |
|---|---|---|
| 1,145,227 | 3/1963 | Germany. |

RUDOLPH V. ROLINEC, Primary Examiner

E. F. KARLSEN, Assistant Examiner

U.S. Cl. X.R.

324—117; 325—111; 332—12

UNITED STATES PATENT OFFICE
CERTIFICATE OF CORRECTION

Patent No. 3,467,864                 Dated 16 September 1969

Inventor(s) M. P. Vander Plaats

It is certified that error appears in the above-identified patent and that said Letters Patent are hereby corrected as shown below:

Claim 4, Column 9, Line 1: Insert --minimum-- between "predetermined" and "magnitude".

SIGNED AND SEALED
MAY 12 1970

(SEAL)
Attest:

Edward M. Fletcher, Jr.
Attesting Officer

WILLIAM E. SCHUYLER, JR.
Commissioner of Patents